3,354,121
POLYMERS OF POLYHEDRAL BORON
COMPOUNDS
Walter H. Knoth, Jr., Mendenhall, Pa., and Rudolph H. Michel, Tonawanda, N.Y., assignors to E. I. du Pont de Nemours and Company, Wilmington, Del., a corporation of Delaware
No Drawing. Filed Feb. 20, 1963, Ser. No. 260,347
19 Claims. (Cl. 260—47)

This invention relates to new boron-containing polymers and their preparation.

The importance of synthetic polymers in present-day technology is well known, for hundreds of polymers are produced commercially, and are made into useful articles such as fibers, plastics, films, protective coatings, and adhesives. This has stimulated the search for new polymers superior to or markedly different from those already known.

Recently, two closely related, completely new chemical entities, the polyhedral borane anions $B_{10}H_{10}^=$ and $B_{12}H_{12}^=$, have been reported [Knoth et al., J. Am. Chem. Soc., 84, 1056 (1962)].

There have now been made new types of polymers containing these anionic $B_{10}$ and $B_{12}$ nuclei, or "cages," as essential components. These new polymers are polyamides and polyesters of anionic $B_{10}$ and anionic $B_{12}$ dicarboxylic acids in which the carboxyl carbons are directly attached to boron atoms of the cage. The polymers are prepared by reacting a dicarbonyl of a $B_{10}$ or $B_{12}$ cage compound, a dicarboxylic acid derivative of a $B_{10}$ or $B_{12}$ cage compound, or a polyamide-forming or polyester-forming derivative of said dicarboxylic acid derivative, with a complementary polyfunctional reactant containing at least two groups of the class consisting of primary amino groups, secondary amino groups, hydroxyl groups, and thiol groups.

The new polymers may be described as polyamides and polyesters in which the recurring unit has the formula (1) 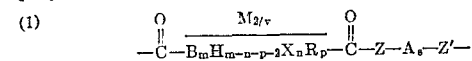

where

M is a cation of valence $v$, defined in more detail below, the term "$2/v$" being a subscript that gives the number of M groups present;
X is halogen;
R is aliphatically saturated hydrocarbyl of 1–18 carbon atoms defined in more detail below;
$m$ is 10 or 12;
$n$ is a cardinal number between 0 and $m-2$, inclusive;
$p$ is 0, 1, or 2, being 0 when $m$ is 12; and the sum of $n$ and $p$ is at most $m-2$;
Z and Z' are the same or different and are O (oxygen), S,

where Q and Q' are the same or different and are hydrogen or lower alkyl, and when joined together, alkylene; and $s$ is 0 or 1, being 1 when Z or Z' is oxygen or sulfur; and
A is: (a) a divalent radical and is aliphatically saturated hydrocarbyl or aliphatically saturated hydrocarbyl interrupted by up to two separated oxygen, sulfur, or nitrogen atoms, each of 2–18 carbon atoms, or, when Z and Z' are oxygen, (b) a divalent $B_{10}$ or $B_{12}$ moiety of the formula (2) 

where

M' is a cation of valence $v'$, defined further below the term "$2/v'$" being a subscript that gives the number of M' groups present;
X' is halogen;
$q$ is 10 or 12; and
$r$ is a cardinal number between 0 and $q-2$, inclusive.

When $n$ is greater than one, the X groups can be the same or different; when $p$ is greater than one, the R groups can be the same or different; and when $r$ is greater than one, the X' groups can be the same or different.

In one process, hereinafter referred to as Process I, polymers of the invention are made by reacting at least one compound of the formula (3) $B_mH_{m-n-p-2}X_nR_p(CO)_2$ where all the terms are as defined above, optionally in the presence of a proton acceptor, Y (defined below), with at least one compound of the formula (4) $HZ{-}A_s{-}Z'H$ where A, $s$, Z, and Z' are as defined above.

In another process, hereinafter referred to as Process II, polymers of the invention are made by reacting one or more dicarboxylic acids or derivatives thereof of the formula (5) 

where

M'' is a cation of valence $v''$, the term $2/v''$ being a subscript that gives the number of M'' groups present;
the D groups are the same or different and are hydroxyl, halogen, aliphatically saturated hydrocarbyloxy, or $ND'_2$, where the D' groups are the same or different and are hydrogen or aliphatically saturated hydrocarbyl; and
the other terms are as defined above, with at least one compound of Formula 4.

Formulas 2 and 5 can be written alternatively as

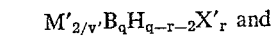 and

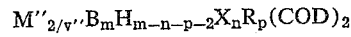

respectively.

From Formula 1 it will be seen that the polymers of the invention include polyamides, polyesters, (including polythioesters), and polyesteramides (including polythioesteramides), the particular type depending on the nature of Z and Z'. In addition, since more than one compound of Formula 3 or 5 and more than one compound of Formula 4 can be used, the polymers include copolyamides, copolyesters, and copolyesteramides. Accordingly, there can be more than one type of repeating unit in a given polymer.

The preferred polymers, particularly for use in preparing films and fibers, have molecular weights above 10,000. However, polymers of lower molecular weight, e.g., in the 3,000–10,000 range, can be used in making adhesives or coating compositions.

The products of the invention are characterized by the fact that on treatment with aqueous mineral acids, e.g., with hydrochloric acid, they are hydrolyzed to give compounds of Formula 4 and of Formula 5 in which D is OH, corresponding to the starting materials used in the process of the invention. When the compound of Formula 4 is an amine or a diamine, it is obtained on acid hydrolysis as the corresponding mineral-acid salt, which on treatment with alkali yields the free amine. The dicarboxylic acid of Formula 5 obtained on hydrolysis can be dehydrated to give the corresponding dicarbonyl or Formula 3.

Structural features of the polymers

The novel feature of the polymers of the invention is the recurring entity (6)
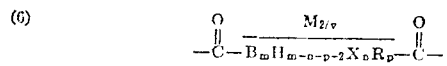

of Formula 1. The intermediates of Formulas 3 and 5, which are used to introduce this entity into the polymer molecules, are all derived from compounds containing $B_{10}H_{10}^=$ or $B_{12}H_{12}^=$ anions, referred to previously. Their preparations are discussed in a later section.

The group X in Formulas 1, 3, 5, and 6 is halogen, i.e., fluorine, chlorine, bromine, or iodine. For economic reasons and because of ease of preparation of intermediates, chlorine and bromine, especially chlorine, are preferred halogens. Also because of ease of preparation of intermediates, when halogen is present in the boron-containing moiety, polymers in which at least half the available boron atoms in the polyboron cage are bonded to halogen, i.e., in which $n$ is at least $\frac{1}{2}(m-p-2)$, are preferred. An especially preferred class is that in which all the available boron atoms are bonded to halogen, i.e., in which $n$ equals $m-p-2$.

The group R in Formulas 1, 3, 5, and 6 is an aliphatically saturated hydrocarbyl group, preferably of 1–18 carbons for reasons of availability. Examples are hydrocarbyl groups derived from methane, ethane, isobutane, octane, octadecane, cyclopropane, cyclopentane, methylcyclopentane, cylodecane, p-menthane, cyclohexadecane, xylene, tert-butylbenzene, dodecylbenzene, napthalene, biphenyl, phenanthrene, anthracene, and 9,10-dihydroanthracene. A more preferred class are groups derived from hydrocarbons of 1–10 carbons, especially cyclic hydrocarbons of 3–10 carbons.

Polymers containing no R groups [$p=0$ in Formula 1] constitute a preferred class because the intermediate $B_{10}$ compounds are more readily available.

A most preferred class of polymers, because the fewest steps are required for the preparation of the boron-containing starting materials of Formulas 3 and 5, are those free of X and R groups, i.e., in which $n$ and $p$ are 0.

The cation M is present in the polymers of Formula 1 prepared by Process I because in the reaction involved a proton (hydrogen ion) is released for each

linkage and each

linkage that is formed, and each $B_mH_{m-n-p-2}X_nR_p$ moiety acquires a double negative charge. This is illustrated by a typical polymerization reaction, that of decaborane (8) dicarbonyl with hexamethylenediamine, in the absence of a proton acceptor.

(7)
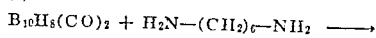
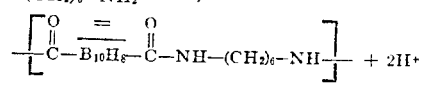

The protons are customarily written in association with the doubly negatively charged $B_{10}H_8$ moiety:

(8)
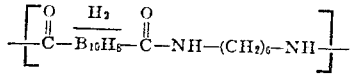

the representation of the charges associated with the protons and the $B_{10}H_8$ unit being optional. In the polymer of Formula 8, the M of generic Formula 1 is hydrogen and $v$ is 1.

In a variation of Process I when Z and Z′ are oxygen and/or sulfur, the diol, dithiol, or hydroxy thiol is first converted to a metallic salt, preferably a bis(alkali-metal) salt, MeZA$_s$Z′Me, where Me is an alkali metal, and the salt is reacted with the polyboron dicarbonyl. In this variation the cation, M, in the resulting polymer is that of the metal Me. Sodium is the preferred alkali metal in this connection, for reasons for economy and reactivity. In the same manner, a monometallic salt can be used when the HZA$_s$Z′H compound is a hydroxy amine or an amino thiol.

In polymers prepared by Process II, the cation, M, in the product of Formula 1 is the same as the cation, M″, already present in the starting material of Formula 5.

It will now be seen that when a proton acceptor, Y, is used in Process I, the cation, M, present in the product is YH, the cation formed by addition of a proton to Y. This cation can also, of course, be written YH+, to designate its unipositive charge.

Operable proton acceptors, Y, include tertiary amines (including diamines), i.e., amines in which the nitrogen or nitrogens are bonded solely to carbon. Because of availability and the absence of side reactions when they are used, aliphatically saturated tertiary amines, including heterocyclic amines, containing only carbon, hydrogen, and nitrogen, having at most 18 carbons and containing at most one aryl group bonded directly to nitrogen are preferred. Examples are triethylamine, methyldihexylamine, triethylenediamine, N,N′-tetraethylhexamethylenediamine, N,N′-tetramethylethylenediamine, triisobutylamine, cyclopentyldiethylamine, tricyclohexylamine, dodecyldipropylamine, N-ethylpyrrolidine, N-undecylpiperidine, N-methylhexamethyleneimine, dimethylbenzylamine, dipentyl(phenethyl)amine, N,N-dimethylaniline, pyridine, quinoline, and 5-ethyl-2-methylpyridine.

In practice it is advantageous to use a proton acceptor of about the same basicity as the compound of Formula 4 or higher, although weaker bases can be used. Especially preferred proton acceptors, therefore, because they work well with any type of HZA$_s$Z′H compound (Formula 4) are tertiary amines or di(tertiary amines) in which any hydrocarbon groups are alkyl, cycloalkyl, or alkylene. ("Alkylene" as used here refers to a divalent, saturated, aliphatic hydrocarbon radical, e.g., ethylene, —CH$_2$CH$_2$—.) When the reactant of Formula 4 contains no amino groups, i.e., when Z and Z′ are oxygen and/or sulfur, the basicity of the proton acceptor, Y, is less important, and weaker amines such as pyridine, N,N-dimethylaniline, quinoline, and 5-ethyl-2-methylpyridine can be used just as advantageously as the preferred amines described above.

Most preferred proton acceptors, because of availability and basicity, are tri(lower alkyl)amines in which each carbon bonded to nitrogen contains at least one hydrogen, especially triethylamine.

From the foregoing discussion, it will be seen that in a polymer of Formula 1 prepared by Process I, M can be hydrogen or YH, where Y is as defined above.

As is the case with monomeric compounds containing the $B_{10}H_{10}^=$ and $B_{12}H_{12}^=$ ions and their substituted derivatives, when polymers of this invention in which M is hydrogen are prepared or worked with in the presence of electron-donor solvents or diluents, the polymers are ordinarily isolated as solvates, in which the solvated molecules are presumably associated with the hydrogen ions. Typical donor molecules of this type, i.e., molecules that can associate with hydrogen ions, are water, alcohols, ethers, nitriles, and carboxamides. An average of more or less than one such solvate molecule can be associated with a given hydrogen ion. When M is hydrogen, the presence or absence of solvate molecules, and the degree of solvation when such molecules are present, is not critical and is of no particular importance to the present invention. It is to be understood, therefore, that the term "hydrogen," as used here, i.e., as a value of M, includes hydrogen ions solvated with molecules of the types discussed above. This usage of the term "hydrogen" is based on nomenclature approved by the International Union of Pure and Applied Chemistry; see J. Am. Chem. Soc., 82, 5529–30 (1960). Polymers containing solvate molecules are illustrated in the remarks following Example 7 and in Example 20. When polymers of the invention in which M is hydrogen are prepared or worked with in non-donor solvents, e.g., in methylcyclohexane as in Example 4, no added solvate molecules are present in the polymers.

In polymers prepared by Process II, M, and therefore also M″, can be any of a wide variety of cations. For example, M can be a cation of any metal in the Periodic Table shown in Deming's "General Chemistry," fifth edition, page 156 (Wiley, 1944), i.e., a metal of Groups I–A, II–A, III–A, IV–A, V–A, VI–A, I–B, II–B, III–B, IV–B, V–B, VI–B, VII–B, or VIII. For example, M can be lithium, potassium, rubidium, cesium, beryllium, magnesium, calcium, barium, strontium, copper, mercury, aluminum, tin, bismuth, silver, zinc, vanadium, chromium, manganese, ruthenium, cobalt, nickel, or any other metal. Preferred metal cations are those having valences of 1, 2, or 3. Especially preferred metals, for reasons of availability, are those of Groups I–A and II–A, i.e., alkali metals and alkaline-earth metals.

When the valence, $v$, of the cation, M, is greater than 2, the term $2/v$ becomes fractional. It will be understood by one skilled in the art that in such cases the term $M_{2/v}$ is used for convenience of expression only, that there are actually no fractional numbers of cations present in the polymer, and that therefore any amount of polymer containing a repeating unit of Formula 1 contains a whole number of cations. The foregoing applies equally to the terms $M'_{2/v'}$ of Formula 2 and $M''_{2/v''}$ of Formula 5.

M, and therefore also M″, can also be an organic or organo-inorganic cation, for example, an ammonium, phosphonium, or sulfonium cation of the formula $U_2U'NH^+$, $U_3U'N^+$, $U'_4P^+$, or $U'_3S^+$, where U is aliphatically saturated hydrocarbyl bonded to the nitrogen, phosphorus, or sulfur through aliphatic carbon, U′ is aliphatically saturated hydrocarbyl, and any two U and/or U′ groups can be joined, directly or through an oxygen heteroatom, together to form an alkylene or oxygen-interrupted alkylene radical. Because of easier availability, cations in which U and U′ contain at most 12 carbons each and any alkylene group contains at most 12 carbons are preferred. Examples are N-hexylmorpholinium, pyridinium, triisopropylammonium, N-methylpiperidinium, trihexylammonium, diethyl-[2-(β-naphthyl)ethyl]ammonium, N,N-dipropylanilinium, benzyltrimethylammonium, tetraisopentylammonium, didodecyldiethylammonium, butyldimethyl(phenyl)ammonium, 1,1-dimethylhexamethyleneiminium, tetrabenzylphosphonium, ethyltriphenylphosphonium, tetramethylphosphonium, isobutylethylmethylpropylphosphonium, ethylpentamethylene-p-tolylphosphonium, tetra(α-naphthyl)phosphonium, triphenylsulfonium, methyltetramethylenesulfonium, benzyldodecylmethylsulfonium, methyldipentylsulfonium, and trimethylsulfonium. An especially preferred group of cations of this type are those in which the U and/or U′ groups are the same and are lower alkyl, particularly the tetra(lower alkyl)ammonium cations.

In Formula 2, M′ can be any of the cations described above as values of M, and M and M′ can be the same or different.

In addition, since the polymers of the invention are soluble in ionizing solvents such as dimethylforamide, dimethylacetamide, and N-methylpyrrolidone, and since some of them are also soluble in water, the cation, M, in a polymer of Formula 1 can be replaced by any of an extremely wide variety of other cations by exchange reactions carried out by well-known techniques, including in particular the use of cation-exchange resins. Cations that can be introduced by these techniques include, for example, cations of the type recited above and also any of an extremely wide variety of other cations.

For example, by virtue of this possibility of cation-exchange, M in Formulas 1 and 6 can be hydrogen, ammonium, or hydrazonium.

M can also, for example, be a complex cation of any of the metals referred to above, e.g., tetramminecopper (II), diamminezinc(II), diaquotetramminechromium (III), tris(1,2-propanediamine)chromium(III), nitratopentamminecobalt(III), dichlorobisethylenediaminecobalt(III), dicyclopentadienyliron(III), dibenzenechromium(I), and tris(acetylacetonato)silicon.

As a further example, M can also be any of a very broad class of substituted ammonium or hydrazonium cations represented by the formulas $U'NH_3^+$, $UU'NH_2^+$, $U'N_2H_4^+$, $U'_2N_2H_3^+$, $U'_3N_2H_2^+$, and $UU'_3N_2H^+$, where U and U′ are as previously defined. Examples are methylammonium, cyclopropylammonium, 1-methylheptylammonium, 2-(1-naphthyl)ethylammonium, diisobutylammonium, dicyclohexylammonium, dinonylammonium, morpholinium, dodecamethyleniminium, phenylhydrazonium, 1-methyl-1-phenylhydrazonium, 1-methyl-2-isopropylhydrazonium, dodecylhydrazonium, 1,1,2-triethylhydrazonium, 1,1,1-triheptylhydrazonium, tetramethylhydrazonium, and tetrabenzylhydrazonium.

Because of availability, the preferred types of cations of those described in the preceding three paragraphs are hydrogen, ammonium, (lower alkyl)ammonium, and di(lower alkyl)ammonium.

As stated previously, the preferred value of X′ is halogen, i.e., fluorine, chlorine, bromine, or iodine. Groups of Formula 2 containing halogen substituted on the boron cage, i.e., in which $r$ is one or greater, are more readily miscible, and thus react more readily, with the carbonyls of Formula 3, and therefore constitute a preferred type. The most easily prepared halogen-containing compounds are the relatively highly halogenated ones, i.e., those in which $r$ is between $q-7$ and $q-2$, inclusive, and these compounds constitute a more preferred type. In the $B_{10}$ series, an especially preferred class is that in which $r$ is 7 or 8, i.e., $q-3$ or $q-2$. Chlorine is the preferred halogen, for reasons of cost and ease of preparation of intermediates.

The group A in Formula 1 is introduced by use of the compound $HZA_sZ'H$ of Formula 4. Broadly, the compound $HZA_sZ'H$ can be any diamine, diol, dithiol, hydroxy thiol, hydroxy amine, or amino thiol that will form a polyamide, a polyester, or a polyesteramide with a dicarboxylic acid such as adipic acid or a dicarboxylic acid derivative such as dimethyl terephthalate or sebacoyl chloride, but the reaction conditions for the formation of the boron-containing polymers may differ appreciably from the conditions for the formation of these previously known polyamides and polyesters. This class of condensation-polymer intermediates, as it pertains to organic compounds, is well known in the art, the various types of compounds within the class being described and exemplified in many U.S. patents. See, for example, U.S. 2,012,267, 2,071,250, 2,130,948, 2,149,273, 2,158,064, 2,176,074, 2,274,831, 2,510,567, 2,516,585, and 2,527,374.

Because of availability, ease of polymerization, and relative absence of side reactions when they are used, preferred intermedites of this type are diamines, diols, dithiols, hydroxy thiols, amino thiols, and hydroxy amines of Formula 4 in which (a) A is divalent, aliphatically saturated hydrocarbyl of at least two carbons, in which any carbon chain can be interrupted by up to two separated oxygen, sulfur, or nitrogen heteroatoms, said heteratoms being removed from Z and Z′ by at least one carbon and preferably at least two carbons; and (b) Z and Z′ are the same or different and are O (oxygen), S,

or

where Q and Q' are the same or different and are hydrogen or lower alkyl, and where Q and Q' can be joined together to form an alkylene radical.

Examples are hydrazine,
ethylenediamine,
tetramethylenediamine,
octadecamethylenediamine,
N,N'-diethylhydrazine,
N-propyltrimethylenediamine,
N,N'-dipentylpentamethylenediamine,
3-methylhexamethylenediamine,
1,4-cyclohexanediamine,
di(4-aminocyclohexyl)methane,
1,4-di(aminomethyl)cyclohexane,
m-phenylenediamine,
1,4-naphthylenediamine,
3,5-diamino-1-ethylbenzene,
4-aza-4-methylheptamethylenediamine,
3-oxapentamethylenediamine,
6-thiaundecamethylenediamine,
3-oxo-6-thia-octamethylenediamine,
piperazine,
2,5-dimethylpiperazine,
1,4-piperazinebis(propylamine),
ethylene glycol,
propylene glycol,
octamethylene glycol,
hexadecamethylene glycol,
1,2-cyclopentanediol,
resorcinol,
3,6-dioxa-octamethylene glycol (triethylene glycol),
1,6-hexanedithiol,
1,2-di(2-mercaptoethoxy)ethane,
p-xylylenedithiol,
di(3-aminophenyl) sulfide,
2-aminoethyl alcohol,
10-mercapto-1-dodecanol,
6-mercapto-1-hexanol,
2-(2-hydroxyethoxy)ethylamine,
4-aminobutyl alcohol,
6-mercaptohexylamine,
p-di(6-mercaptohexyloxy)benzene,
12-aminododecyl alcohol,
5-aminohexyl alcohol,
4-(4-aminophenyl)cyclohexanol,
p-hydroxymethylbenzylamine, and
4-(2-aminoethyl)benzenethiol.

Suitable glycols also include the commercially available class of polymeric compounds known as polyalkylene glycols, which are essentially long-chain alkylene terminal glycols containing regularly spaced oxygen heteroatoms, and which are formed by self-condensation of alkylene glycols and by mixtures of different alkylene glycols. Examples are polyethylene glycol, polytetramethylene glycol, and polyethylene-propylene glycol. Polymeric compounds of this type of relatively low molecular weight, e.g., about 150–5000, are ordinarily used.

Because of availability, a more preferred class of organic $HZA_sZ'H$ compound in which the exact composition is known is that in which A contains at most 18 carbons, and especially that in which A contains at most 13 carbons. Compounds in which any polymer-forming amino groups are primary, i.e., in which Q and/or Q' are hydrogen, are preferred because of their greater ease of polymerization. For the same reason, when Z and/or Z' are oxygen and/or sulfur, it is preferred that said oxygen and/or sulfur be bonded to aliphatic carbon. When the group A contains one or more nitrogen heteroatoms, it is preferred that any such nitrogen be tertiary, i.e., that it be bonded solely to carbon, since the polymers from such intermediates have superior tractability.

As previously stated and discussed, A can also be a divalent $B_{10}$ or $B_{12}$ moiety of Formula 2.

Both because of availability and because of the relative simplicity of the polymerization procedures involved, compounds of Formula 4 in which Z and Z' are the same, i.e., diamines, diols, and dithiols, are especially preferred, diamines and diols being the most preferred.

*Processes of the invention*

In both Processes I and II, as in most condensation-polymerization reactions, equivalent quantities of the boron compound and the compound $HZA_sZ'H$ are ordinarily used. Nonequivalent quantities can be used if desired, but polymers of relatively low molecular weight may result. When the $HZA_sZ'H$ compound is an amine or a diamine, in some cases its reactivity as a proton acceptor is enough greater than its reactivity in polyamide formation that an excess of the compound can be present and function as a proton acceptor without adversely affecting the properties of the polymer. Ordinarily said excess does not exceed the amount required to accept all the protons formed in the polymerization reaction. That is, at most two equivalents of $HZA_sZ'H$ compound per equivalent of polyboron dicarbonyl are ordinarily used when the $HZA_sZ'H$ compound is a diamine and three equivalents when it is a monoamine.

The groups represented by D in Formula 5 are eliminated in the reaction of Process II and hence do not appear in the polymeric product. Therefore they are not a critical feature of the compounds of Formula 5. Solely because of availability and reactivity in Process II, the preferred saturated aliphatic hydrocarbyl groups that can appear in the D group (i.e., in the hydrocarbyloxy group or as values of D' in the $ND'_2$ group) are those of at most seven carbons. Examples are methyl, ethyl, tert-butyl, isopentyl, hexyl, cyclopentyl, 4-methylcyclohexyl, phenyl, meta-tolyl, and benzyl. For the same reasons, preferred halogens as values of D are chlorine and bromine, chlorine being especially preferred for economic reasons. Of all the types of carboxyl derivatives represented by Formula 5, the free carboxylic acids (D = OH) and the esters (D = aliphatically saturated hydrocarbyloxy) are usually the easiest to prepare and hence are the most preferred types of intermediate, the free acids being especially preferred.

In addition to the monomeric starting materials of Formulas 3, 4, and 5, there can be present as reactants in the polymerization mixture compounds such as lactams and lactones. The products of the invention therefore include copolymers containing repeating units derived from these cyclic monomers. Examples of such monomers are ε-caprolactam, γ-butyrolactam, pivalolactone, and ε-caprolactone.

Furthermore, in Process II, compounds containing complementary amide-forming or ester-forming groups within the same molecule can be present as reactants in the polymerization mixture; and the products of the invention include copolymers containing repeating units derived from such compounds. Most of these compounds are substituted aliphatically saturated hydrocarbon-carboxylic acids of up to eighteen carbon atoms. Examples of such additional starting materials include m- and p-aminobenzoic acids, α-, β- and γ-aminobutyric acids, 10-aminodecanoic acid, α- and ε-aminocaproic acids, 6-amino-4,4-dimethylheptanoic acid, 17-aminoheptadecanoic acid, lactic acid, ε-mercaptocaproic acid, ε-methylaminocaproic acid, and 12-hydroxyoctadecanoic acid, together with derivatives of such acids of the types defined in Formula 5.

Ordinarily, in the resulting polymers, the recurring units arising from the types of compounds described in the preceding two paragraphs do not exceed 50 mole percent of the total recurring units.

In addition, in Process II, a part of the $B_{10}$ or $B_{12}$ dicarboxylic acid or acid derivative of Formula 5 can be replaced by an equivalent amount of a non-boron containing dicarboxylic acid in which both carboxyl groups are bonded to carbon, or by a derivative of such an acid of the types defined in Formula 5; the copolymers thus produced are also included in the products of the invention. Examples of such dicarboxylic acids are adipic acid, sebacic acid, terephthalic acid, 1,4-piperazinediacetic acid, cyclopentane-1,3-dicarboxylic acid, β-methylpimelic acid, thiodibutyric acid, and oxybis(4-benzeneacetic acid). When such dicarboxylic acids or their derivatives are among the polymerization components, the compound or compounds of Formula 4 preferably do not contain boron.

The repeating units derived from the lactams, lactones, amino acids, hydroxy acids, and carbon-bonded dicarboxylic acids and their derivatives discussed above are not critical features of the invention, and accordingly any of a wide variety of these compounds can be used in preparing copolyamides, copolyesters, and copolyesteramides.

In either Process I or Process II, in addition to the reactants and coreactants described in the foregoing paragraphs, small amounts of monocarboxylic acids or derivatives thereof, monoamines containing at least one hydrogen bonded to nitrogen, monoalcohols, or monothiols can be added to the polymerization mixtures to control the molecular weight of the polymers produced. In the same manner, small amounts of compounds containing more than two carboxyl groups or derivatives thereof, more than two amino groups in which each nitrogen is bonded to at least one hydrogen, more than two hydroxyl groups, more than two thiol groups, or any combination of such amino, hydroxyl, and thiol groups totaling more than two, can be added to the polymerization mixtures to effect desirable degrees of crosslinking of the polymers. Both these methods of affecting the natures of the polymers produced are well known in the art.

In Process I, the use of a proton acceptor is optional. In general, it is preferred to use a proton acceptor, in order to eliminate the possibility of side reactions involving or catalyzed by the protons that are released. When an acceptor other than an excess of the $HZA_sZ'H$ compound is used, the amount is customarily at least equivalent to the total amount of polyboron dicarbonyl used, i.e., at least one equivalent of proton acceptor, Y, per carbonyl group is customarily present. There is no upper limit on the amount of proton acceptor that can be used, and an upper limit is suggested only by problems of solubility, volatility, and removal of excess proton acceptor. In practice, there is little or no advantage to be gained by using more than 25 equivalents of Y per carbonyl group, and ordinarily the ratio will be between 1 and 5. The point at which the proton acceptor is added is not critical. It can be added at the start of the process, after the process is partly complete, or after the process is complete and the polymer has been isolated. In the preparation of polymers that are insoluble in solvents suitable for conducting the proton-accepting reaction, the proton acceptor is preferably added at the start of the process.

In Process II, as stated previously, the presence of the cation, M, in the starting material makes it unnecessary to use a proton acceptor.

A solvent or diluent is not required for either process, since polymerization even of solid reactants can be brought about by heating to high enough temperatures. To permit operation at lower temperatures, however, and in some cases to moderate the reaction between reactive starting materials, an inert solvent or diluent or mixture thereof is frequently used. In general, any liquid free of groups that react with carboxylic acids, primary or secondary amines, alcohols, or thiols in the absence of a catalyst can be used. Examples are hydrocarbons (e.g., benzene, xylene, heptane, cyclohexane, and decahydronaphthalene); carboxylic acid amides free of hydrogen bonded to nitrogen (e.g., N-methylpyrrolidone, dimethylformamide, and dipropylacetamide); nitriles (e.g., acetonitrile, butyronitrile, and benzonitrile); ethers (e.g., butyl ether and 1,2-dimethoxyethane); and chlorinated hydrocarbons (e.g., chlorobenzene, chloroform, and ethylene chloride). Mixtures of any of the above can be used. When a tertiary-amine proton acceptor is used in Process I, an excess of it can function as the solvent or as a component of a mixed-solvent system.

In Process II, when the reactant of Formula 4 is a diol, a dithiol, or a hydroxy thiol, any of the many well-known catalysts for esterification reactions, and especially for polyesterification reactions, can be used. However, it is not necessary to use a catalyst in any of these variations of the process.

The temperature will depend largely on whether Process I or Process II is used, and in either process may also depend on the particular reactants employed. Polymerizations by Process I can take place at temperatures as low as 0° C., and usually proceed readily at ordinary temperatures (20–30° C.), as evidenced by the heat of reaction liberated under these conditions. To insure as complete a reaction as possible, the temperature is sometimes raised, particularly near the end of the reaction period, to as high as 150° C. or 200° C. Actually, temperatures up to the decomposition points of the product can be used, but no advantage results. Preferred temperatures are 20–150° C., especially 20–110° C. The process can be carried out at atmospheric, subatmospheric, or superatmospheric pressure; atmospheric pressure is usually used for convenience.

In Process II, conditions of temperature and pressure are essentially those used in known polycondensation reactions involving the same functional groups. Higher temperatures than those used in Process I are usually employed, i.e., between about 100° C. and the decomposition temperatures of the products. The preferred range is about 125–275° C. Pressure is not a critical factor, but, as in many condensation-polymerization procedures involving removal of water, subatmospheric pressures are frequently used to advantage, especially in the latter stages of the process.

As in many polyamidation reactions, Process II can be carried out for diamines, hydroxy amines, and amino thiols by first forming and isolating a salt of the dicarboxylic acid and the amino compound and then heating the salt to effect polymerization.

The processes are carried out in standard equipment used for condensation-polymerization reactions.

The time required can vary widely, depending on whether Process I or Process II is used, and on the reactants, the solvent if one is used, the temperature, and the molecular weight desired. Polymerization by Process I can be completed in as little as 15 minutes at about 100° C., although usually from one to twenty-four hours is used. At ordinary temperatures, the time is usually 0.5 to 40 hours. With Process II, at 100–200° C., times as long as several days are sometimes used; above 200° C., the time required is less, and polymerization can be completed in as little as one hour. The progress of the polymerization can be followed by taking out small samples of the reaction mixture, determining their infrared absorption spectra, and observing to what extent absorptions characteristic of the reactants have disappeared and absorptions characteristic of the product are present.

The polymeric products can be isolated by evaporating any volatile materials present or by drowning the reaction mixture in a non-solvent and filtering, washing, and drying the product. Water and inert hydrocarbons such as heptane are usually suitable non-solvents.

The polymers of the invention are solids or in some cases viscous liquids, stable to air and water.

Inert materials such as dyes, pigments, fillers, delusterants, plasticizers, and antioxidants can be incorporated in the polymers, either by being included in the polymerization mixtures or by being mixed with the preformed polymer by known techniques. Polymers containing such additives are included in the products of the invention.

*Preparation of intermediates*

As stated previously, the starting materials for the preparation of the $B_{10}$ and $B_{12}$ intermediates are compounds containing the $B_{10}H_{10}^=$ and $B_{12}H_{12}^=$ anions. These compounds are prepared as follows:

$B_{10}$ *Compounds.*—Ammonium decahydrodecaborate, $(NH_4)_2B_{10}H_{10}$, can be prepared in quantitative yield by the reaction of a decaboryl bis(lower dialkyl sulfide), e.g., decaboryl bis(dimethyl sulfide), $B_{10}H_{12}[(CH_3)_2S]_2$, with liquid ammonia at a temperature between about $-50°$ C. and $0°$ C. The product is isolated simply by evaporating any excess, unreacted ammonia. This process is described in detail in Knoth, U.S. Patent 3,148,938, issued Sept. 15, 1964. The decaboryl bis(lower dialkyl sulfide) is prepared by allowing decaborane, $B_{10}H_{14}$, to react with a lower dialkyl sulfide at a temperature of at least $0°$ C., and preferably at least $25°$ C., until approximately one mole of hydrogen per mole of decaborane is evolved. This process is described in detail in Muetterties, U.S. Patent 3,154,561, issued Oct. 27, 1964.

$(NH_4)_2B_{10}H_{10}$ is converted to the bisdiazonium compound $B_{10}H_8(N_2)_2$ by reaction with $NaNO_2/HCl$ in aqueous solution at $15°$ C. or lower, followed by reduction of the intermediate product (which is not isolated) with zinc and hydrochloric acid. The bisdiazonium compound is separated from the crude solid product by extraction with alcohol. This process is described in detail in assignee's copending application Ser. No. 186,270, filed Apr. 9, 1962, in the name of Walter H. Knoth, Jr., now abandoned and refiled as application Serial No. 324,885, filed Nov. 19, 1963.

$B_{10}H_8(CO)_2$ and its hydrocarbyl-substituted derivatives, $B_{10}H_8\text{-}pR_p(CO)_2$, where $p$ is 0, 1, or 2, as defined on pages 2 and 3 are prepared by reacting $B_{10}H_8(N_2)_2$ with carbon monoxide at $125–250°$ C. and 500–1,000 atmospheres in the presence or absence of a hydrocarbon or mixture of hydrocarbons, preferably at most two hydrocarbons. In the absence of any hydrocarbon, $B_{10}H_8(CO)_2$ is the sole product. In the presence of a hydrocarbon or hydrocarbons, one or two R groups derived by removal of hydrogen from the hydrocarbon or hydrocarbons are introduced. Halogen groups (X in Formula 3 are introduced into the $B_{10}$ dicarbonyls just described by reacting a dicarbonyl with the appropriate free halogen in aqueous solution at $0–100°$ C. In aqueous solution, the carbonyls exist as hydrates of the acids $H_2B_{10}H_8\text{-}pR_p(COOH)_2$, and they are halogenated in this form. The halogenated carbonyls are obtained by evaporation of the solutions, which gives hydrates of the halogenated acids, followed by dehydration of the latter by heating. For example $B_{10}Cl_8(CO)_2$ (Example 7) is prepared by reacting chlorine with an aqueous solution of $B_{10}H_8(CO)_2$ at $0–30°$ C., evaporating to get a hydrate of $H_2B_{10}Cl_8(COOH)_2$ and heating the hydrate up to $300°$ C. and atmospheric pressure to obtain the carbonyl by dehydration and sublimation. The foregoing products and processes are described in detail in Knoth, U.S. Patent 3,166,378, issued Jan. 19, 1965.

$B_{10}$ dicarboxylic acids (Formula 5, $m=10$) are prepared by reacting $B_{10}$ dicarbonyls with water, as described in the preceding paragraph, or, preferably, with an equivalent amount of a hydroxide containing the cation M. The process is illustrated in Example 8. The cation, M, so introduced can be replaced by any other cation that can be a value of M by conventional exchange-reaction techniques, including the use of ion-exchange resins. These processes are described in U.S. 3,116,378, and in more detail in assignee's copending application Ser. No. 237,392, filed Nov. 13, 1962, in the name of Walter H. Knoth, Jr.

Esters, acid halides, and amides of the $B_{10}$ dicarboxylic acids can be prepared from the acids by methods well known in organic chemistry. The esters and amides can also be prepared directly from the $B_{10}$ dicarbonyls by reaction with alcohols and amines, respectively. The latter process is illustrated in Example 21. In the carboxylic acid derivatives produced by either method, the cation, M, in the compound in question can be replaced by any other cation that can be a value of M by the aforementioned exchange-reaction techniques.

To obtain compounds containing the $B_{10}H_8(OH)_2^=$ ion, which constitute one type of $HZA_sZ'H$ compound that can be used in the process of the invention, $(NH_4)_2B_{10}H_{10}$ is reacted with N-methylpyrrolidone in the presence of concentrated hydrochloric acid at $170°$ C. The compound $B_{10}H_8(\text{N-methylpyrrolidone})_2$ thus produced is heated with sodium hydroxide to give the compound $Na_2B_{10}H_8(OH)_2$. The sodium ion can be exchanged for other cations, e.g., tetramethylammonium, by well-known ion-exchange techniques referred to above. Halogenated $B_{10}$ diols are prepared by direct reaction of the appropriate halogen with an acidic aqueous solution of $H_2B_{10}H_8(OH)_2$, obtained by simply acidifying $Na_2B_{10}H_8(OH)_2$, at $25–100°$ C. For example,

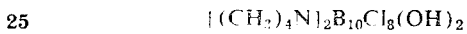

(Example 14) is prepared in this way by acidifying with hydrochloric acid, halogenating with chlorine, and adding aqueous tetramethylammonium hydroxide to the solution of the primary product to precipitate the desired salt. These processes are also described in Ser. No. 237,392.

$B_{12}$ *Compounds.*—The primary starting material for the preparation of the $B_{12}$ compounds used in Processes I and II is diborane, $B_2H_6$. Any alkali-metal salt of the acid $H_2B_{12}H_{12}$ can be prepared by the reaction of the appropriate alkali-metal hydroborate, e.g., $NaBH_4$, with diborane in the presence of an ether such as ethyl ether or 1,2-dimethoxyethane. The process is carried out in a closed system at a temperature of at least $100°$ C. and at autogenous pressure, which pressure should be at least three atmospheres. The product can be recrystallized from ethers such as ethyl ether or tetrahydrofuran or mixtures thereof. Any organic solvate of crystallization can be removed by mixing the product with water and distilling out the organic solvate. The product is then isolated by evaporation. The sodium salt is thus obtained as a hydrate, the exact degree of hydration depending on the extent of drying. Hydrates of the acid $H_2B_{12}H_{12}$ can be prepared by simply acidifying the sodium salt with a strong mineral acid such as HCl or by bringing a solution of the sodium salt into contact with an acidic cation-exchange resin. The acid hydrates are isolated by evaporation, the degree of hydration obtained again depending on the extent of evaporation. These processes are described in assignee's copending U.S. Patent 3,328,134 in the names of Henry C. Miller and Earl L. Muetterties, now abandoned and refiled as application Ser. No. 421,697, filed Dec. 28, 1964.

$B_{12}H_{10}(CO)_2$ is prepared by reacting a hydrate of $H_2B_{12}H_{12}$ with carbon monoxide at $60–150°$ C. and 500–1000 atmospheres. This process is described in assignee's copending application Ser. No. 206,554, filed June 28, 1962, in the name of John C. Sauer.

Compounds containing the $B_{12}H_{10}(COOH)_2^=$ anion are prepared by reacting with the corresponding dicarbonyl, $B_{12}H_{10}(CO)_2$, with water or an aqueous hydroxide containing the cation M of Formula 5. The resulting compounds of the formula $M_{2/v}B_{12}H_{10}(COOH)_2$ can be halogenated directly with the appropriate free halogen in aqueous solution at temperatures of about $25–150°$ C. The exact temperature depends on the halogen to be introduced and the degree of substitution desired. For example, treatment of $Cs_2B_{12}H_{10}(COOH)_2$ with excess chlorine at $90–100°$ C. in aqueous solution, followed by cation exchange with tetramethylammonium chloride, gives

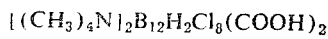

Esters, acid halides, and amides of these acids are made in the same manner as the corresponding $B_{10}$ acid derivatives. Compounds containing dihydroxy $B_{12}$ anions are prepared by essentially the processes described above for the corresponding $B_{10}$ compounds. The foregoing processes are described in Ser. No. 246.636, filed Dec. 21, 1962, in the name of H. C. Miller and E. L. Muetterties.

The following examples illustrate the products and in each case the product is actually a polymer in which any boron-containing recurring unit carries a double negative charge, said charge being neutralized by a cation or cations, M (or M'), associated with the repeating unit. In the present example, M is triethylammonium.

The procedure of Example 1 can also be used to make polyamides from the following combinations of polyboron dicarbonyls, diamines, and proton acceptors:

| Polyboron Dicarbonyl | Diamine or Diamines | Proton Acceptor |
|---|---|---|
| $B_{12}H_{10}(CO)_2$ | Di(p-aminophenyl) ether | Tripropylamine. |
| $B_{16}H_6(C_6H_{11})_2(CO)_2$* | m- and p-Phenylenediamine | Triisopentylamine. |
| $B_{10}Br_8(CO)_2$ | Di(p-aminophenyl)methane and hexamethylenediamine. | Tricyclopentylamine. |
| $B_{10}HCl_7(CO)_2$ plus ε-caprolactam | 2,2-Di(m-aminophenyl)-propane. | N-methylpiperidine. |
| $B_{10}Br_7C_{10}H_{17}(CO)_2$* | 1,2-Di(o-aminophenyoxy)-ethane. | N-butylpyrrolidine. |
| $B_{10}H_7C_6H_5(CO)_2$ | Di(m-aminophenyl) sulfide. | N,N,N'-tetramethyl-ethylenediamine. |
| $B_{10}H_2Cl_3(C_{10}H_{21})_2(CO)_2$ | 1,4-naphthylenediamine. | Triisopropylamine. |
| $B_{10}H_6(C_6H_{11})(C_7H_{15})(CO)_2$ | Di(p-aminophenyl) ether. | Triethylamine. |

*$C_6H_{11}$ is cyclohexyl; $C_{10}H_{17}$ is decahydronaphthyl.

processes of the invention. For the sake of simplicity, the equations shown in the various examples are partly schematic, in that they show only the formation of the repeating unit of Formula 1. It is to be understood that the actual product of each example is in fact a polymer containing the repeating unit shown.

EXAMPLE 1

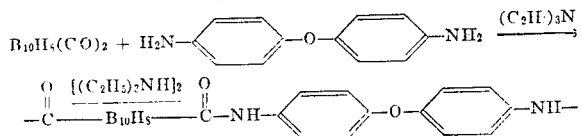

In an atmosphere of nitrogen, a tubular glass reactor was charged with 0.6890 g. of $B_{10}H_8(CO)_2$, 0.8010 g. of di(p-aminophenyl) ether, 6 ml. of N-methylpyrrolidone, and 1.62 g. of triethylamine. The open end of the reactor was closed with a rubber cap fitted with a narrow-bore gas-inlet tube (the lower end of which was free of the reaction mixture) and a similar gas-exit tube. A slow stream of nitrogen was passed through the reactor from the gas-inlet tube throughout the process. Thus, volatile material could be released slowly from the reactor through the gas-exit tube, but only nitrogen could enter the reactor. The mixture was heated at 60–80° C. for one hour, by which time the reaction mixture was a viscous mass. Volatile material was removed from the reactor at temperatures up to 100° C. and 0.1 mm. pressure. There was thus obtained 2.4 g. of a polyamide of $B_{10}H_8(CO)_2$ and di(p-aminophenyl) ether as a light-tan solid.

*Analysis.*—Calcd. for $C_{26}H_{50}B_{10}N_4O_3$: C, 54.5; H, 8.7; N, 9.8. Found: C, 54.5; H, 8.6; N, 10.4.

The polymer was soluble in dimethylformamide and in N-methylpyrrolidone, and insoluble in chloroform, acetonitrile, isopropyl alcohol, and water. Its infrared absorption spectrum (sodium chloride prism) showed bands at 2.99μ (>N—H), 3.37μ (unsaturated C—H), 4.06μ (>B—H), 6.27 and 6.35μ

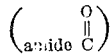
(amide C)

6.72μ (N—H of secondary amide), and 12.0μ (p-disubstituted benzene ring). The characteristic >B—CO band at 4.55μ had completely disappeared. The inherent viscosity of the polymer was 0.1 (0.1% solution in dimethylformamide at 25° C.). A self-supporting film of the polymer was cast from dimethylformamide solution.

It is to be understood that the relatively simple term "polyamide of $B_{10}H_8(CO)_2$ and di(p-aminophenyl) ether" used above, together with similar terms in subsequent examples, is used for convenience of expression, and that

EXAMPLE 2

By the method of Example 1, a mixture of 0.4930 g. of $B_{10}H_8(CO)_2$, 0.5732 g. of di(p-aminophenyl) ether, 4 ml. of N-methylpyrrolidone, and 0.72 g. of triethylamine was polymerized by heating at 130° C. for four hours. A polyamide of $B_{10}H_8(CO)_2$ and di(p-aminophenyl) ether similar to the product of Example 1 was obtained.

A mixture of one gram of this polymer with 25 ml. of concentrated hydrochloric acid was refluxed with stirring for four hours. The mixture was filtered to remove a small amount of insoluble material, and the hot filtrate was made basic with aqueous 10% sodium hydroxide. Upon cooling, 0.25 g. of di(p-aminophenyl) ether separated as a solid, and was removed by filtration and identified by its infrared absorption spectrum. The filtrate was concentrated at 25° C. and 0.1 mm. pressure nearly to dryness and acidified with concentrated hydrochloric acid. Evaporation of this solution gave a hydrate of the acid $$H_2B_{10}H_8(COOH)_2$$

which upon further evaporation and finally sublimation at 90° C./0.1 mm. gave 0.2 g. of $B_{10}H_8(CO)_2$, also identified by its infrared absorption spectrum.

EXAMPLE 3

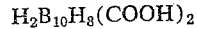

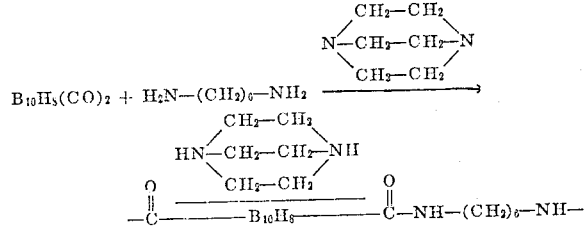

By the method of Example 1, a mixture of 0.8230 g. of $B_{10}H_8(CO)_2$, 0.5544 g. of hexamethylenediamine, and 1.6058 g. of triethylenediamine was polymerized by heating at 140° C. for three hours. The polyamide of $$B_{10}H_8(CO)_2$$

and hexamethylenediamine thus obtained was agitated with 200 ml. of water in a Waring Blendor, separated by filtration, and dried.

*Analysis.*—Calcd. for $C_{14}H_{36}B_{10}O_2$: C, 41.9; H, 9.0. Found: C, 37.9; H, 7.6.

The infrared absorption of the polymer (mineral-oil mull) had absorption at 2.9μ (>N—H), 4.0μ (>B—H), and 6.0μ, 6.3μ, and 6.5μ

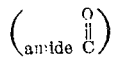
(amide C)

EXAMPLE 4

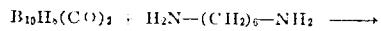
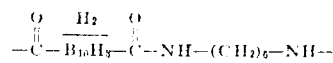

A solution of 0.416 g. of hexamethylenediamine in 25 ml. of methylcyclohexane was added dropwise with stirring over a period of 15 minutes to a solution of 0.62 g. of $B_{10}H_8(CO)_2$ in 25 ml. of methylcyclohexane at 45–50° C. A white solid precipitate formed immediately as the diamine solution was added. After the addition was complete, the mixture was heated at about 100° C. under reflux for 2.5 hours. The polyamide of $B_{10}H_8(CO)_2$ and hexamethylenediamine thus formed was separated by centrifugation, washed with methylcyclohexane, and dried at about 50° C./0.5 mm. The yield was 0.8 g.

*Analysis.*—Calcd. for $C_8H_{24}B_{10}N_2O_2$: C, 33.30; H, 8.39; B, 37.51; N, 9.71. Found: C, 33.24; H, 8.54; B, 36.59; N, 10.10.

Another sample of this polyamide, prepared by the above procedure, had a molecular weight by light scattering of 53,000, and an inherent viscosity of 0.16–0.2 (0.25% solution in N-methylpyrrolidone). Hard, tough, glassy coatings of the polymer were obtained by casting solutions in N-methylpyrrolidone on glass and on copper surfaces and evaporating the solvent. The coating on copper showed a high dissipation factor and had a capacitance of 2156 micromicrofarads.

Other polyboron dicarbonyls and diamines can be substituted for $B_{10}H_8(CO)_2$ and hexamethylenediamine in essentially the method of Example 4 to give polymers of this invention. Examples are the following:

| Polyboron Dicarbonyl | Diamine or Diamines |
|---|---|
| $B_{10}I_8(CO)_2$ | N,N'-Dimethylhexamethylenediamine. |
| $B_{10}H_7C_1H_9(CO)_2$ | Di(3-aminopropyl) ether and N-butyl hexamethylenediamine. |
| $B_{12}H_{10}(CO)_2$ | Trimethylenediamine. |
| $B_{10}H_8(C_2H_5)_2(CO)_2$ | Di(4-aminocyclohexyl)methane. |

EXAMPLE 5

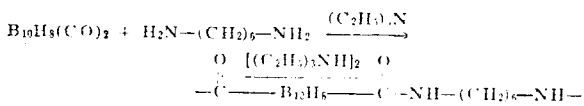

$B_{10}H_8(CO)_2$ (0.7854 g.) was added in portions with stirring to a solution of 0.5291 g. of hexamethylenediamine, 10.8 g. of triethylamine, and 5 ml. of acetonitrile. The mixture warmed slightly because of heat of reaction. It was stirred at ordinary temperatures for 0.5 hour, during which time a gel-like solid gradually separated. The solid was removed by filtration, and volatile materials were evaporated from the solid at 100° C./0.1 mm. There was thus obtained 1.3 g. of a polyamide of $B_{10}H_8(CO)_2$ and hexamethylenediamine as a white solid.

*Analysis.*—Calcd. for $C_{20}H_{54}N_4O_2B_{10}$: C, 48.9; H, 11.0; N, 11.4. Found: C, 50.6; H, 11.8; N, 11.3.

The polymer was soluble in dimethylformamide and in m-cresol. A colorless, self-supporting film was pressed from the polymer at 150° C. and 4000 lbs./sq. in.

A uniform, flexible coating of this polyamide on copper wire was produced by dipping a copper wire into a 13% solution of the polymer in dimethylformamide, and slowly removing, and drying the coated wire.

EXAMPLE 6

A 500-ml. glass reactor, "creased" to promote intimate mixing of materials by high-speed stirring, and equipped with two graduated dropping funnels, a condenser, and a high-speed stirrer, was charged with 40 ml. of triethylamine and 40 ml. of cyclohexane. A solution of 1.1520 g. of $B_{10}H_8(CO)_2$ in 40 ml. of benzene was placed in one dropping funnel, and a solution of 0.7761 g. of hexamethylenediamine in 5 ml. of acetonitrile and 35 ml. of benzene was placed in the other dropping funnel. During refluxing and stirring at about 3500 r.p.m., the two solutions were added to the triethylamine/cyclohexane mixture at approximately equal rates over a period of 20 minutes, and the reaction mixture was then refluxed with stirring for five hours. During this time a solid polyamide of $B_{10}H_8(CO)_2$ and hexamethylenediamine precipitated. Volatile materials were removed from the polyamide by evaporation at 25° C. and atmospheric pressure in a stream of nitrogen.

*Analysis.*—Calcd. for $C_{20}H_{54}N_4O_2B_{10}$: N, 11.4. Found: N, 11.0.

The product was soluble in dimethylformamide. Its infrared absorption spectrum showed bands at 2.9μ (>N—H), 4.0μ (>B—H), and 6.5μ

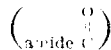

There was no absorption at 4.6μ characteristic of >B—CO.

EXAMPLE 7

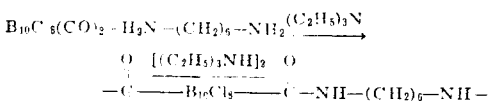

A solution of 2.9362 g. of freshly sublimed $$B_{10}Cl_8(CO)_2$$

in 40 ml. of acetonitrile and 10 ml. of benzene was mixed with a solution of 0.7599 g. of hexamethylenediamine in 5 ml. of acetonitrile and 3.6 g. of triethylamine. The mixture warmed noticeably from heat of reaction. It was heated at 50–80° C. with stirring for six hours, cooled, and filtered to give 3.8 g. of a solid polyamide of $B_{10}Cl_8(CO)_2$ and hexamethylenediamine.

*Analysis.*—Calcd. for $C_{20}H_{46}B_{10}Cl_8N_4O_2$: C, 31.5; H, 6.0; Cl, 37.2; N, 7.3. Found: C, 35.4; H, 6.1; Cl, 33.4; N, 6.8.

The polymer was insoluble in acetonitrile, water, dimethylformamide, m-cresol, and dimethyl sulfoxide. The infrared absorption spectrum of the product (mineral-oil mull) had bands at 2.8μ, 2.9μ, 6.3μ, and 6.6μ, characteristic of the polyamide structure.

A self-supporting film of the polyamide was pressed at 245° C. It had a dielectric constant of 5.1 at 1,000 cycles and a dissipation factor of 0.02.

A polyamide containing hydrogen ions in place of the triethylammonium ions of the above formula, the hydrogen ions in each repeating unit being solvated with an average of about 1.6 molecules of 1,2-dimethoxyethane, was obtained by reacting $B_{10}Cl_8(CO)_2$ with hexamethylenediamine in 1,2-dimethoxyethane. A 10% solution of this polyamide in dimethylformamide was flowed onto a glass plate. Evaporation of the solvent gave a hard, transparent protective coating on the glass.

EXAMPLE 8

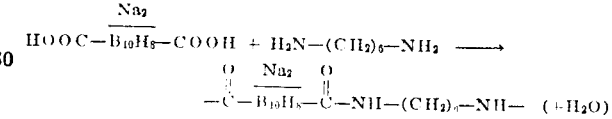

A solution of $Na_2B_{10}H_8(COOH)_2$ in water was prepared by titrating 0.8117 g. of $B_{10}H_8(CO)_2$ with dilute aqueous sodium hydroxide. Nearly all of the water was evaporated at 25 mm. pressure, and 0.5467 g. of hexamethylenediamine was added. Most of the water remaining in the mixture was distilled off by boiling at atmospheric pressure and the remaining mixture was heated at 218° C./0.1 mm. for six hours. There was thus obtained 1.5 g. of a polyamide of $Na_2B_{10}H_8(COOH)_2$ and hexamethylenediamine, which was a friable, light-tan solid.

*Analysis.*—Calcd. for $C_8H_{22}B_{10}N_2Na_2O_2$: C, 28.8; H, 6.6; N, 8.4. Found: C, 25.4; H, 6.1; N, 8.1.

The infrared absorption spectrum of the polymer (mineral-oil mull) had bands at 2.7μ, 2.9μ, 4.02μ, 6.2μ, 6.5μ, 6.9μ, 7.8μ, 8.6μ and 10.0μ, and no >B—CO absorption at 4.5μ. The inherent viscosity of the polymer was 0.16 (0.1% solution in dimethylformamide).

By essentially the procedure of Example 8, polyamides of the present invention can also be made from other combinations of polyboron dicarboxylic acids and diamines. Examples are the following:

| Polyboron Dicarboxylic Acid or Acids | Diamine or Diamines |
|---|---|
| $HOOC-\overset{K_2}{\overline{B_{10}Cl_8}}-COOH$ | Octamethylenediamine. |
| $HOOC-\overset{Ca}{\overline{B_{10}Br_8}}-COOH$ | 1,4-benzenebis(1,3,3-trimethylpropylamine). |
| $HOOC-\overset{[(CH_3)_3S]_2}{\overline{B_{10}H_7C_{10}H_{17}}}-COOH$ | Ethylenediamine. |
| $HOOC-\overset{[(C_4H_9)_4N]_2}{\overline{B_{10}I_5I_5}}-COOH$ | Di(p-aminophenyl) ether. |
| $HOOC-\overset{Mg}{\overline{B_{12}H_7Cl_3}}-COOH$ | 1-cyclohexylhexamethylenediamine. |
| $HOOC-\overset{[(C_2H_5)_4P]_2}{\overline{B_{12}H_{10}}}-COOH$ | Decamethylenediamine and hydrazine. |
| $HOOC-\overset{Na_2}{\overline{B_{10}I_5}}-COOH$ and $HOOC-\overset{Na_2}{\overline{B_{12}I_{10}}}-COOH$ | Hexamethylenediamine. |
| $HOOC-\overset{K_2}{\overline{B_{10}I_5}}-COOH$ and ε-aminocaproic acid | Pentamethylenediamine. |
| $HOOC-\overset{Na_2}{\overline{B_{12}H_3F_5}}-COOH$ | Dodecamethylenediamine. |
| $HOOC-\overset{K_2}{\overline{B_{10}Br_4Cl_4}}-COOH$ | Di-(4-aminophenyl)methane. |

EXAMPLE 9

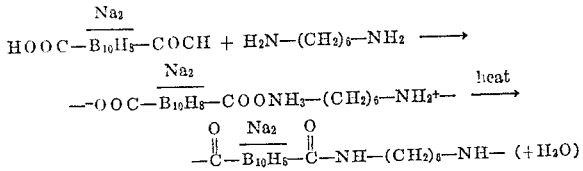

A solution of 0.8870 g. of $Na_2B_{10}H_8(COOH)_2$ and 0.4083 g. of hexamethylenediamine in 35 ml. of methanol was allowed to stand at ordinary temperature. Within two hours, crystals separated and were removed by filtration and dried. On standing 20 hours at ordinary temperature, the filtrate deposited more crystals, which were isolated in the same way. Both of these products were the salt of $Na_2B_{10}H_8(COOH)_2$ and hexamethylenediamine. The second sample of the salt was characterized by its elemental analysis and infrared absorption spectrum.

*Analysis.*—Calcd. for $C_8H_{26}B_{10}N_2Na_2O_4$: C, 26.2; H, 7.1; N, 7.6. Found: C, 25.4; H, 7.8; N, 6.5

The infrared absorption spectrum (mineral-oil mull) had bands at 2.65μ, 3.05μ, 4.0μ, 5.0μ, 6.2μ, 6.55μ, 8.65μ, 9.0μ, 9.7μ, 9.95μ, and 10.7μ in agreement with the structure of the salt shown above.

The first sample of the crystalline salt was heated in an apparatus like that of Example 1 at 180° C./0.1 mm. for 14 hours and then at 150–160° C./0.1 mm. for 68 hours. The polyamide of $Na_2B_{10}H_8(COOH)_2$ and hexamethylenediamine thus obtained was swollen in dimethylformamide and in m-cresol and was insoluble in water and in formic acid.

EXAMPLE 10

Copolyamide of $Na_2B_{10}H_8(COOH)_2$, adipic acid and hexamethylenediamine A tubular glass reactor was charged with 1.8390 g. of an aqueous solution containing 1.6496 g. of hexamethylenediamine and with a concentrated aqueous solution (>50%) containing 0.2244 g. of $Na_2B_{10}H_8(COOH)_2$ and 1.9475 g. of adipic acid. The reactor was flushed with nitrogen, evacuated to 0.1 mm. pressure, and sealed. The mixture was heated to 100° C., by which temperature a homogeneous solution formed. The reactor was opened and most of the water was removed by distillation at atmospheric pressure, after which the reactor was again evacuated and sealed. The reaction mixture was heated at 218° C. and autogenous pressure for one hour and cooled. The reactor was then opened once more, evacuated to 0.1 mm. pressure, and heated at 265° C./0.1 mm. for about three hours, and then at 305° C. for ten minutes. The extremely viscous melt, consisting of the copolyamide of $Na_2B_{10}H_8(COOH)_2$, adipic acid, and hexamethylenediamine, was highly swelled by m-cresol and by formic acid. The amount of $Na_2B_{10}H_8(COOH)_2$ charged into the reactor was about 5.8% corresponding to 2.9% boron in the copolyamide. A boron analysis showed 3.2% boron.

A film pressed from the copolyamide at 270° under pressure was clear and tough.

In place of adipic acid, any organic polyamide-forming dibasic acid can be used to form a copolyamide of the type just described. Examples are sebacic acid, oxalic acid, 4-methylazaheptanedioic acid, oxydibutyric acid, and isophthalic acid.

EXAMPLE 11

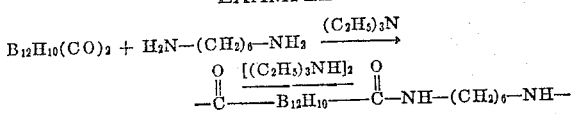

By the method of Example 1, a mixture of 0.1373 g. of $B_{12}H_{10}(CO)_2$, 0.0801 g. of hexamethylenediamine, 0.58 g. of triethylamine, and 3.5 ml. of N-methylpyrrolidone was heated at 80–90° C. for 20 hours. The mixture was dissolved in water, the aqueous solution was concentrated, and the residual polyamide of $B_{12}H_{10}(CO)_2$ and hexamethylenediamine was dried at 100°C./0.1 mm. in the presence of $P_2O_5$.

*Analysis.*—Calcd. for $C_{20}H_{56}B_{12}N_4O_2$: C, 46.4; H, 10.8; N, 10.8. Found: C, 43.5; H, 10.7; N, 11.6.

The infrared absorption spectrum of the polymer (mineral-oil mull) had strong bands at 2.9μ (>N–H), 4.0μ (>BH), and 6.0μ.

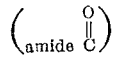

EXAMPLE 12

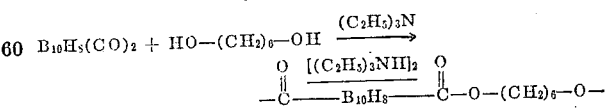

A mixture of 0.8682 g. of $B_{10}H_8(SO)_2$, 0.5949 g. of hexamethylene glycol, and 2.88 g. of triethylamine was heated in a tubular glass reactor at atmospheric pressure until about half the triethylamine had been distilled off. The reactor was flushed with nitrogen, sealed, and heated at 130° C. and autogenous pressure for 60 hours. After cooling, opening the reactor, and drying the product at 100° C./0.1 mm., a tan, solid polyester of $B_{10}H_8(CO)_2$ and hexamethylene glycol was obtained.

*Analysis.*—Calcd. for $C_{20}H_{52}B_{10}N_2O_4$: C, 48.8; H, 10.6; N, 5.7. Found: C, 47.2; H, 10.5; N, 5.9.

The infrared absorption spectrum of the polyester (mineral-oil mull) had absorption at 6.2μ.

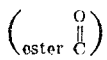
(ester $\overset{O}{\underset{\|}{C}}$)

The inherent viscosity of the polymer was 0.11 (0.25% solution in dimethylformamide).

This polyester was dissolved in dimethylformamide to give a 10% solution. A piece of copper wire was covered with the polymer solution for 30 minutes and then removed, and the solvent was removed by evaporation. A continuous, flexible coating of the $B_{10}H_8(CO)_2$/hexamethylene glycol polyester on the wire was formed.

Essentially the procedure of Example 12 can be used to make polymers of this invention from other polyboron dicarbonyls, glycols, dithiols, hydroxy thiols, hydroxy amines, diamines, amino thiols, and mixtures thereof, for example, from the following:

| Polyboron Dicarbonyl | HZA,Z'H Reactant or Reactants | Proton Acceptor |
|---|---|---|
| $B_{10}Cl_8(CO)_2$ | Ethylene glycol | Methyldipropylamine. |
| $B_{10}Br_8(CO)_2$ | Triethylene glycol | Pyridine. |
| $B_{12}H_{10}(CO)_2$ | 1,4-Cyclohexanediol and hexamethylene glycol. | N,N-Dimethylaniline. |
| $B_{10}H_8(CO)_2$ | 1,6-Hexanedithiol | Triethylamine. |
| $B_{10}I_2(CO)_2$ | Propylene glycol | Tripentylamine. |
| $B_{10}H_8(CO)_2$ | Di(2-hydroxyethyl) sulfide and ethylene glycol. | Quinoline. |
| $B_{12}H_{10}(CO)_2$ | Tetramethylene glycol | Methyldipentylamine. |
| $B_{10}H_6(C_6H_{11})_2(CO)_2$ | 4-(p-Aminophenyl)-cyclohexanol | Triethylamine. |
| $B_{10}H_7Cl(CO)_2$ | 6-Aminohexanol and hexamethylene glycol. | Tri(2-ethylhexyl)-amine. |
| $B_{12}H_{10}(CO)_2$ | p-Hydroxymethylbenzyl mercaptan. | Tripropylamine. |
| $B_{10}Cl_7CH_3(CO)_2$ | 2,2-Dimethyltrimethylene glycol | Tri(sec-butyl)amine. |
| $B_{10}I_8(CO)_2$ | Hydrazine and diethylene glycol | 1-Ethylhexamethylen-imine. |
| $B_{10}H_8(CO)_2$ and $B_{10}Cl_8(CO)_2$. | Decamethylene glycol | Triethylamine. |
| $B_{10}Cl_8(CO)_2$ | 12-Amino-1-dodecanethiol | Do. |
| $B_{12}H_3Cl_7(CO)_2$ | Decamethylene glycol and 1,10-decanedithiol. | Do. |

EXAMPLE 13

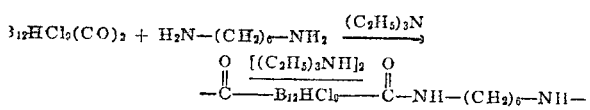

$B_{12}HCl_9(CO)_2 + H_2N-(CH_2)_6-NH_2 \xrightarrow{(C_2H_5)_3N}$ $-\overset{O}{\underset{\|}{C}}-B_{12}HCl_9-\overset{[(C_2H_5)_3NH]_2}{\overset{O}{\underset{\|}{C}}}-NH-(CH_2)_6-NH-$ A reactor like that of Example 1 was charged with .3020 g. of $B_{12}HCl_9(CO)_2$, 0.0692 g. of hexamethylenediamine, and 10 ml. of acetonitrile. There was a slight rise in temperature, corresponding to an exothermic reaction, and a complete solution resulted. Triethylamine (0.36 .) was added, and the mixture was heated at 80–85° C. or 2.5 days. The mixture was then cooled and drowned in excess water, and the solid that precipitated was separated by filtration and dried. There was thus obtained a solid polyamide of $B_{12}HCl_9(CO)_2$ and hexamethylenediamine. The infrared absorption spectrum of the polymer (mineral-oil mull) had absorption at 3.0μ and 3.1μ (amide —H), 3.95μ (weak; B—H), 6.1μ (strong; amide C=O), 3μ (secondary amide C=O overtone), and at 9.5μ, 1.7μ, and 13.9μ ($B_{12}$ polyhedron).

EXAMPLE 14

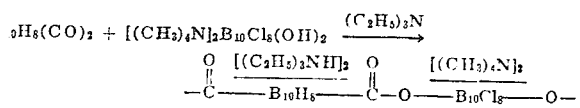

$B_{10}H_8(CO)_2 + [(CH_3)_4N]_2B_{10}Cl_8(OH)_2 \xrightarrow{(C_2H_5)_3N}$ $-\overset{O}{\underset{\|}{C}}-B_{10}H_8-\overset{[(C_2H_5)_3NH]_2}{\overset{O}{\underset{\|}{C}}}-O-B_{10}Cl_8\overset{[(CH_3)_4N]_2}{-}O-$ By the method of Example 1, a mixture of 0.4282 g. $B_{10}H_8(CO)_2$, 1.4278 g. of $[(CH_3)_4N]_2B_{10}Cl_8(OH)_2$, and 4.4 g. of triethylamine was heated at 90° C. for 16 hours and then at 150–160° C. for 18 hours, all at atmospheric pressure. The tan, solid polyester of $B_{10}H_8(CO)_2$ and $[(CH_3)_4N]_2B_{10}Cl_8(OH)_2$ obtained on cooling weighed 1.8 g.

Analysis.—Calcd. for $C_{22}H_{64}B_{20}Cl_8N_4O_4$: C, 28.0; H, 3; N, 5.9. Found: C, 29.2; H, 7.0; N, 5.8.

The inherent viscosity of the polymer was 0.11 (0.25% dimethylformamide).

EXAMPLE 15

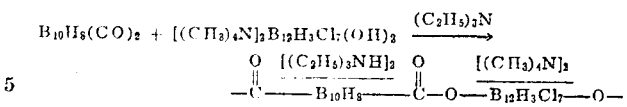

$B_{10}H_8(CO)_2 + [(CH_3)_4N]_2B_{12}H_3Cl_7(OH)_2 \xrightarrow{(C_2H_5)_3N}$

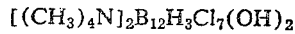

$-\overset{O}{\underset{\|}{C}}-B_{10}H_8-\overset{[(C_2H_5)_3NH]_2}{\overset{O}{\underset{\|}{C}}}-O-B_{12}H_3Cl_7\overset{[(CH_3)_4N]_2}{-}O-$ By the method of Example 1, a mixture of 0.3318 g. of $B_{10}H_8(CO)_2$, 1.0802 g. of $[(CH_3)_4N]_2B_{12}H_3Cl_7(OH)_2$, 0.72 g. of triethylamine, and 6 ml. of acetonitrile was heated at 75–80° C. and atmospheric pressure for 24 hours. The solid polyester of $B_{10}H_8(CO)_2$ and $[(CH_3)_4N]_2B_{12}H_3Cl_7(OH)_2$ obtained by cooling was drowned in water. The solution was filtered to remove a trace of insoluble material and evaporated, as the polymer thus obtained was dried at 100° C./0.1 mm. It was soluble in water and in dimethylformamide.

Analysis.—Calcd. for $C_{22}H_{67}B_{22}Cl_7N_4O$: C, 28.2; H, 7.2; N, 6.0. Found: C, 30.1; H, 7.7; N, 6.2.

The infrared absorption of the polymer (mineral-oil mull) showed bands at 4.0μ (>B–H) and 6.0μ

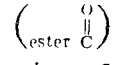
(ester $\overset{O}{\underset{\|}{C}}$)

and essentially no absorption at 2.7μ (—OH).

EXAMPLE 16

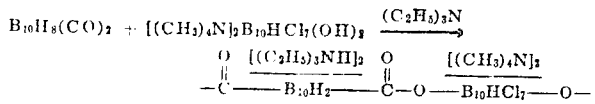

$B_{10}H_8(CO)_2 + [(CH_3)_4N]_2B_{10}HCl_7(OH)_2 \xrightarrow{(C_2H_5)_3N}$

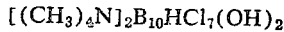

$-\overset{O}{\underset{\|}{C}}-B_{10}H_8-\overset{[(C_2H_5)_3NH]_2}{\overset{O}{\underset{\|}{C}}}-O-B_{10}HCl_7\overset{[(CH_3)_4N]_2}{-}O-$ A mixture of 0.4362 g. of $B_{10}H_8(CO)_2$, 1.3679 g. of $[(CH_3)_4N]_2B_{10}HCl_7(OH)_2$, 0.43 g. of triethylamine, and 4 ml. of acetonitrile was charged to a tubular glass reactor, which was then cooled, evacuated, and sealed. The tube and contents were heated at 125° C. and autogenous pressure for three hours and cooled, and the tube was opened. The mixture was drowned in water, and the insoluble material was separated and dried at 100° C./0.1 mm. to give a solid polyester of $B_{10}H_8(CO)_2$ and $[(CH_3)_4N]_2B_{10}HCl_7(OH)_2$ Analysis.—Calcd. for $C_{22}H_{65}B_{20}Cl_7N_4O_4$: N. 6.1. Found: N, 5.9.

The infrared absorption spectrum of the polymer (mineral-oil mull) had bands at 4.0μ (>B–H), 4.75μ, and 6.2μ

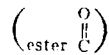
(ester $\overset{O}{\underset{\|}{C}}$)

The polymer had an inherent viscosity of 0.06 (0.1% solution in dimethylformamide).

By the general procedure illustrated in Examples 14–16, polymers of the invention can be made from other polyboron dicarbonyls and polyboron diols, plus, optionally, additional reactants of the type HZA$_s$Z'H, for example the following:

| Polyboron Dicarbonyl | HZA$_s$Z'H Reactant or Reactants | Proton Acceptor |
|---|---|---|
| B$_{10}$Cl$_8$(CO)$_2$ | Rb$_2$B$_{10}$H$_8$(OH)$_2$ | Triheptylamine. |
| B$_{12}$I$_{10}$(CO)$_2$ | SrB$_{12}$H$_{10}$(OH)$_2$ | Triethylamine. |
| B$_{10}$I$_8$(CO)$_2$ | [(CH$_3$)$_4$N]$_2$B$_{12}$Br$_{10}$(OH)$_2$ | Do. |
| B$_{12}$H$_{10}$(CO)$_2$ | [CH$_3$(C$_6$H$_5$)$_3$P]$_2$B$_{10}$Br$_8$(OH)$_2$ and hexamethylenediamine | Tributylamine. |
| B$_{10}$Br$_8$(CO)$_2$ | [(C$_6$H$_5$)$_3$S]$_2$B$_{10}$F$_8$(OH)$_2$ and ethylene glycol | Triethylamine. |
| B$_{10}$H$_8$(CO)$_2$ | CaB$_{12}$I$_8$I(OH)$_2$ and 5-aminopentanol | Do. |
| B$_{10}$Br$_8$(CO)$_2$ | [(CH$_3$)$_4$N]$_2$B$_{12}$Br$_{10}$(OH)$_2$ and 1,4-butanedithiol | Tripropylamine. |
| B$_{12}$Br$_{10}$(CO)$_2$ | Na$_2$B$_{12}$H$_{10}$(OH)$_2$ | Triethylamine. |

It should be emphasized once more that in these examples and in all the foregoing examples in which a polyboron dicarbonyl is used, the use of a proton acceptor is optional. When no proton acceptor is used, the cation M in the resulting polymer is hydrogen, as in the product of Example 4 and the other examples discussed immediately thereafter.

EXAMPLE 17

Under the conditions of Example 1, the apparatus of the same example was charged with 1.2927 g. of $$B_{10}H_8(CO)_2$$

8 ml. of N-methylpyrrolidone, 4 ml. of triethylamine, and 0.8708 g. of hexamethylenediamine. The mixture was agitated vigorously; it warmed perceptibly from the heat of reaction and changed to a viscous, homogeneous solution. After 30 hours at room temperature, volatile material was removed to leave a solid polyamide of B$_{10}$H$_8$(CO)$_2$ and hexamethylenediamine.

*Analysis.*—Calcd. for C$_{20}$H$_{54}$B$_{10}$N$_4$O$_2$: C, 48.9; H, 11.0; N, 11.4. Found: C, 48.4; H, 11.0; N, 11.1, 11.3.

The infrared absorption spectrum of the polymer (mineral-oil mull) had absorption at 6.05μ for

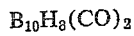

amide C

The triethylammonium cation present in the polymer as formed was exchanged for cesium by mixing an aqueous solution of the polymer with an aqueous solution of cesium hydroxide. The sparingly soluble polymeric cesium salt, having the repeating unit

was separated by filtration and dried.

*Analysis.*—Calcd. for C$_8$H$_{22}$B$_{10}$Cs$_2$N$_2$O$_2$: C, 17.5; H, 4.0; N, 5.1. Found: C, 18.1; H, 4.2; N, 5.1.

EXAMPLE 18

*Polyamide from B$_{10}$H$_8$(CO)$_2$ and diethylenetriamine*

A solution of 0.7142 g. of B$_{10}$H$_8$(CO)$_2$ in 10 ml. of acetonitrile was added with agitation to a soltuion of 0.2848 g. of freshly distilled diethylenetriamine,

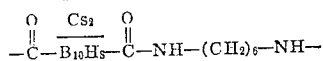

in 5 ml. of triethylamine. A semi-solid mass was formed immediately. The mass was broken up and allowed to stand at room temperature in an atmosphere of nitrogen for 24 hours. The solid polyamide of B$_{10}$H$_8$(CO)$_2$ and diethylenetriamine was separated by filtration and dried.

*Analysis.*—Calcd. for C$_{56}$H$_{41}$B$_{30}$O$_6$N$_{12}$: C, 45.1; H, 10.6; N, 12.6. Found: C, 43.5; H, 10.7; N, 12.2.

The infrared absorption spectrum of the polymer (mineral-oil mull) showed absorption at 2.7μ, 2.9μ, 4.0μ, 6.1μ, 6.45μ, 7.9μ, 8.5μ, 9.3μ, 9.7μ, 10.05μ, and 11.95μ.

The three-dimensional polyamide produced by this procedure can be used as a principal component of thermosetting resins.

EXAMPLE 19

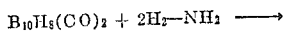

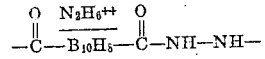

To a solution of 2.0287 g. of B$_{10}$H$_8$(CO)$_2$ in 20 ml. of benzene was added with agitation a solution of 0.7540 g. of hydrazine in 10 ml. of benzene. A white solid precipitated. The mixture was warmed at 40° C. for 18 hours in a stream of nitrogen. During this time, most of the benzene evaporated. Volatile material was removed from a part of the residual material at 100° C./0.1 mm., to give a white, solid polyamide of B$_{10}$H$_8$(CO)$_2$ and hydrazine. The polymer was soluble in water.

*Analysis.*—Calcd. for C$_2$H$_{16}$B$_{10}$N$_4$O$_2$: C, 11.7; H, 6.7; N, 23.3. Found: C, 12.9; H, 7.5; N, 23.9.

The inherent viscosity of the polyamide was 0.03 (0.25% solution in water).

EXAMPLE 20

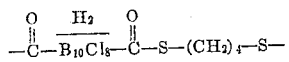

Under an atmosphere of nitrogen, a tubular glass reactor was charged with 2.3169 g. of B$_{10}$Cl$_8$(CO)$_2$, 0.6311 g. of 1,4-butanedithiol, and 15 ml. of acetonitrile. The tube was cooled, sealed and heated at 95–100° C. for four days. Upon removal of volatile materials at 100° C./0.1 mm. there was obtained a solid polythiolester of B$_{10}$Cl$_8$(CO)$_2$ and 1,4-butanedithiol. Analysis showed that each hydrogen ion associated with the polymer was solvated with a molecule of acetonitrile.

*Analysis.*—Calcd. for C$_{10}$H$_{16}$B$_{10}$Cl$_8$N$_2$O$_2$S$_2$: C, 18.5; H, 2.5; N, 4.3; S, 9.8. Found: C, 20.3; H, 2.9; N, 5.3; S, 9.8.

The infrared absorption spectrum of the polymer (mineral-oil mull) showed strong absorption at 6.1μ and 6.4μ (ester C=O), weak absorption at 7.7μ and 8.55μ, and strong absorption at 9.9μ, characteristic of the B$_{10}$ "cage." The inherent viscosity of the polymer was 0.16 (0.25% solution in dimethylformamide).

A 5% solution of the polymer in dimethylacetamide was flowed out on a sheet of copper metal, and the solvent was evaporated. A hard protective coating that adhered well to the copper was thus formed.

Another, similar solution of the polymer in dimethylacetamide was evaporated. Characterization of the residual solid polymer showed that the hydrogen ions in each recurring unit were now solvated with one molecule of acetonitrile and three molecules of dimethylacetamide, i.e., that dimethylacetamide had replaced part of the solvated acetonitrile in the original product of the polymerization described above.

*Analysis.*—Calcd. for C$_{23}$H$_{40}$B$_{10}$Cl$_8$N$_4$O$_5$S$_2$: C, 27.5; H, 4.6; N, 6.5; S, 7.4. Found: C, 27.5; H, 5.0; N, 7.0; S, 7.5.

The infrared absorption spectrum (mineral-oil mull) of the polymer showed stronger absorption characteristic of C=O than did the spectrum of the polymer that had not been treated with dimethylacetamide.

EXAMPLE 21

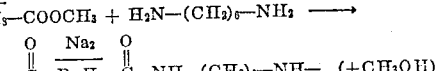

A solution of Na$_2$B$_{10}$H$_8$(COOCH$_3$)$_2$ in methanol was prepared by dissolving 0.5295 g. of sodium in 100 ml. of methanol, dissolving 1.9821 g. of B$_{10}$H$_8$(CO)$_2$ in the solution, and warming at 30–40° C. for five hours. Hexamethylenediamine (1.3352 g.) was added, and the solution was refluxed for six hours and then slowly heated to 140° C., methanol being removed by distillation in an atmosphere of nitrogen during the last step. The non-volatile material remaining was heated at 140° C. for four hours, to give a solid polyamide of B$_{10}$H$_8$(CO)$_2$ and hexamethylenediamine that was soluble in water and insoluble in dimethylformamide.

*Analysis.*—Calcd. for $C_8H_{22}B_{10}N_2Na_2O_2$: C, 28.9; H, 6.7; N, 8.4. Found: C, 27.8; H, 7.4; N, 7.0.

The infrared absorption spectrum (mineral-oil mull) showed absorption at $6.2\mu$ and $6.5\mu$ (amide C=O) and no absorption characteristic of >B—C≡O. The inherent viscosity of the polyamide was 0.61 (0.25% solution in water).

EXAMPLE 22

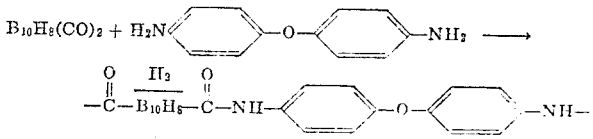

To a solution of 0.058 g. of di(p-aminophenyl) ether in one ml of benzene and one ml. of N-methylpyrrolidone was added 0.050 g. of $B_{10}H_8(CO)_2$ at room temperature. After 15 minutes, a small portion of the resulting solution was removed for another purpose. After about 18 hours at room temperature, the solution was added to excess heptane, and the solid that precipitated was filtered, washed, and dried. It was dissolved in fresh N-methylpyrrolidone, and to the solution was added 0.015 g. of di(p-aminophenyl) ether. After about three hours a solid product was isolated as described above. The latter product was dissolved in N-methylpyrrolidone, 0.025 g. of di(p-aminophenyl) ether was added, and the solution was kept at room temperature for about 18 hours. Precipitation with heptane and isolation as above gave a solid polyamide of $B_{10}H_8(CO)_2$ and di(p-aminophenyl) ether. The infrared absorption spectrum of the product (barium fluoride wafer) showed no absorption corresponding to C≡O, which fact shows that the $B_{10}H_8(CO)_2$ had reacted completely.

EXAMPLE 23

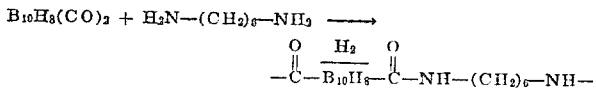

$B_{10}H_8(CO)_2$ (0.050 g.) was added to a solution of 0.0336 g. of hexamethylenediamine in one ml. of M-methylpyrrolidone in a tubular glass reactor at room temperature, and the reactor was immediately sealed. The temperature of the resulting solution rose noticeably, which fact showed that an exothermic reaction was taking place. After 20 hours at room temperature, the solution was poured into excess water, whereupon a tough, resinous, solid polyamide of $B_{10}H_8(CO)_2$ and hexamethylenediamine precipitated.

EXAMPLE 24

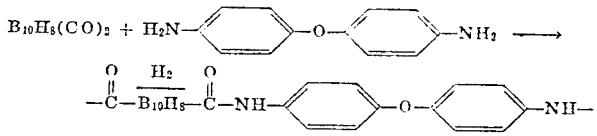

By the method of Example 23, $B_{10}H_8(CO)_2$ (0.100 g.) was reacted with a solution of 0.116 g. of di(p-aminophenyl) ether in one ml. of N-methylpyrrolidone. When the reactants were mixed, an exothermic reaction occurred and the viscosity of the solution increased markedly. The latter fact accords with formation of a polymer. After 18 hours at room temperature, a portion of the solution was evaporated to give a solid polyamide of $B_{10}H_8(CO)_2$ and di(p-aminophenyl) ether. The remainder of the solution was added to a solution of 0.25 g. of tetramethylammonium hydroxide in 20 ml. of ethyl alcohol, whereupon a solid precipitated and was separated by filtration, washed with ethyl alcohol, and dried. The solid was a polyamide having the recurring unit shown above, but in which the hydrogen ions had been replaced by tetramethylammonium ions.

*Utility*

As illustrated in Examples 4, 5, 12 and 20, the polymers of this invention are generically useful for making protective coatings on glass, metals, wood, fabrics, and other surfaces.

The polymers of this invention are compatible with known commercial polymers such as polyacrylonitrile and can be mixed with them to give useful compositions. For example, a 13% polymer solution of the polymer described in Example 12 in dimethylformamide, when combined with a 13% solution of polyacrylonitrile in dimethylformamide, gave a homogeneous, compatible mixture. Evaporation of most or all of the solvent gives a polymeric composition that is useful as a thermosetting resin.

As illustrated in the foregoing Examples 1,5, and 10, the polymers of this invention can be molded into shaped articles from solution or by thermal techniques. The molded articles thus produced are useful in many applications, for example, as light-transparent neutron barriers and space vehicle windows resistant to outer-space radiation.

The polymers of the invention are generically useful as components of solid high-energy fuels, or as cation exchange resins or components thereof.

The higher-molecular-weight polymers of the invention (i.e., those having molecular weights of about 10,000 or higher), and particularly the copolymers containing appreciable amounts of recurring units based on boron-free dicarboxylic acids, can be spun into fibers useful in a broad range of textiles.

The polymers of the invention, particularly those having molecular weights of about 10,000 or lower, are generically useful for making adhesives.

As many apparently widely different embodiments of this invention may be made without departing from the spirit and scope thereof, it is to be understood that this invention is not limited to the specific embodiments disclosed herein.

The embodiments of the invention in which an exclusive property or privilege is claimed are defined as follows:

1. A boron-containing polymer consisting essentially of recurring units of the formula

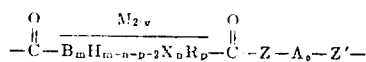

wherein
M is a cation;
$v$ is the valence of M;
$2/v$ is the ratio of M groups to one

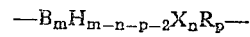

group;
X is halogen;
R is aliphatically saturated hydrocarbyl of 1–18 carbon atoms;
$m$ in a cardinal number selected from the class consisting of 10 and 12;
$n$ is a cardinal number of from 0 to $m-2$, inclusive;
$p$ is a cardinal number of from 0 to 2, inclusive, being 0 when $m$ is 12, and the sum of $n$ and $p$ being at most $m-2$;
Z and Z' each are groups selected from the class consisting of

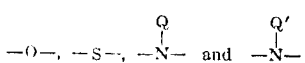

in which Q and Q' are selected from the class consisting of hydrogen, lower alkyl, and when joined together, alkylene;
$s$ is a cardinal number of from 0 to 1, inclusive, being 1 when Z and Z' are selected from the class consisting of —O— and —S—; and
A is selected from the class consisting of (1) a divalent aliphatically saturated hydrocarbyl group of 2–18 carbon atoms which may be interrupted by up to 2 separated atoms selected from the class consisting of oxygen, sulfur, and nitrogen, and, (2) when Z and Z' are oxygen, A can be a divalent boron cage group having the structure

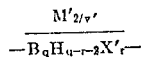

wherein M' is a cation, $v'$ is the valence of M', $2/v'$ is the ratio of M groups to one $—B_qH_{q-r-2}X'_r$ group, X' is halogen, $q$ is a cardinal number selected from the class consisting of 10 and 12, and $r$ is a cardinal number of from 0 to $q-2$, inclusive.

2. The boron-containing polymer of claim 1 wherein M is hydrogen.

3. The boron-containing polymer of claim 1 wherein $s$ is one and A is the divalent aliphatically saturated hydrocarbyl group defined in claim 1.

4. The boron-containing polymer of claim 1 wherein $s$ is 1 and A is the divalent boron cage group defined in claim 1.

5. The boron-containing polymer of claim 1 wherein $p$ is zero.

6. The boron-containing polymer of claim 1 wherein $p$ is zero and $n$ is zero.

7. The boron-containing polymer of claim 1 wherein $p$ is zero, $n$ is $m-2$ and X is chlorine.

8. The boron-containing polymer of claim 1 wherein Z and Z' are each —NH—.

9. The boron-containing polymer of claim 1 in which said recurring unit defined therein is the sole recurring unit.

10. The boron-containing polymer of claim 1 wherein M is a cation formed by addition of a proton to an aliphatically saturated tertiary amine containing at most one aryl group bonded directly to nitrogen.

11. The boron-containing polymer of claim 1 wherein the recurring units have the formula

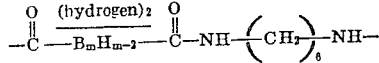

12. The boron-containing polymer of claim 1 wherein the recurring units have the formula

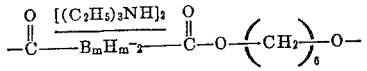

13. The boron-containing polymer of claim 1 wherein the recurring units have the formula

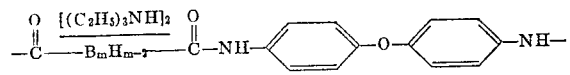

14. The boron-containing polymer of claim 1 wherein the recurring units have the formula

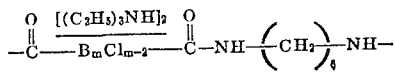

15. The boron-containing polymer of claim 1 wherein the recurring units have the formula

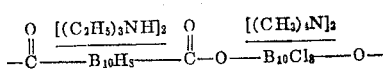

16. A process for preparing polymers of claim 1 which comprises reacting

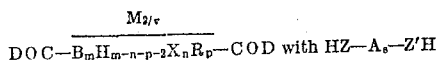

wherein M, X, R, Z, A, Z', $m$, $n$, $p$, $s$, $v$, and $2/v$ are defined as in claim 3, and D is selected from the class consisting of hydroxyl, halogen, aliphatically saturated hydrocarbyloxy of at most seven carbons and $ND'_2$ in which D' is selected from the class consisting of hydrogen and aliphatically saturated hydrocarbyl of at most seven carbons, at a temperature of between about 100° and 275° C.

17. A process for preparing polymers of claim 2 which comprises reacting $B_mH_{m-n-p-2}X_nR_p(CO)_2$ with

wherein Z, Z', A, $s$, X, R, $p$, $n$ and $m$ are defined as in claim 4, at a temperature of between about 0° and 200° C.

18. A process for preparing polymers of claim 1 which comprises reacting $B_mH_{m-n-p-2}X_nR_p(CO)_2$ with

wherein Z, Z', A, $s$, X, R, $p$, $n$ and $m$ are defined as in claim 3, in the presence of a proton acceptor comprising an aliphatically saturated tertiary amine containing at most one aryl group bonded directly to nitrogen, at a temperature of between about 0° and 200° C.

19. The boron-containing polymer of claim 1 which contains additional recurring units of a co-reactant which is a saturated compound containing up to 18 carbon atoms which is selected from the class consisting of lactams, lactones, aliphatically saturated hydrocarbondicarboxylic acids, and aliphatically saturated hydrocrboncarboxylic acids mono-substituted with a member selected from the class consisting of hydroxyl groups and amino groups containing at least one hydrogen bonded to nitrogen; said additional recurring units do not exceed 50 mole percent of the total recurring units.

References Cited
UNITED STATES PATENTS
3,093,687 6/1963 Clark et al. ———————— 260—2
3,166,378 1/1965 Knoth ———————————— 260—514
3,258,479 6/1966 Alexander et al. ———————— 260—75

FOREIGN PATENTS
895,917 5/1962 Great Britain.

WILLIAM H. SHORT, *Primary Examiner.*

C. A. WENDEL, L. P. QUAST, *Assistant Examiner.*